US010065607B2

(12) United States Patent
Thebault et al.

(10) Patent No.: US 10,065,607 B2
(45) Date of Patent: Sep. 4, 2018

(54) DEVICE FOR CONNECTING A WIPER ARM AND A WIPER BLADE TOGETHER INCLUDING AN OVER-MOULDED TUBE

(71) Applicant: Valeo Systemes d'Essuyage, La Verriere (FR)

(72) Inventors: Denis Thebault, Clermont Ferrand (FR); Eric Poton, Pont du Château (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 373 days.

(21) Appl. No.: 14/418,183

(22) PCT Filed: Jul. 30, 2013

(86) PCT No.: PCT/FR2013/051839
§ 371 (c)(1),
(2) Date: Jan. 29, 2015

(87) PCT Pub. No.: WO2014/020279
PCT Pub. Date: Feb. 6, 2014

(65) Prior Publication Data
US 2015/0258966 A1    Sep. 17, 2015

(30) Foreign Application Priority Data

Aug. 2, 2012    (FR) ...................................... 12 57517

(51) Int. Cl.
*B60S 1/38* (2006.01)
*B60S 1/40* (2006.01)
*B60S 1/52* (2006.01)

(52) U.S. Cl.
CPC ........... *B60S 1/3862* (2013.01); *B60S 1/4048* (2013.01); *B60S 1/524* (2013.01)

(58) Field of Classification Search
CPC ............................... B60S 1/3862; B60S 1/524
USPC ......................................... 15/250.04, 250.32
See application file for complete search history.

(56) References Cited

U.S. PATENT DOCUMENTS

| 3,254,358 A * | 6/1966 | Wise ..................... B60S 1/4003 |
| | | 15/250.32 |
| 2010/0011528 A1* | 1/2010 | Boland ................. B60S 1/3862 |
| | | 15/250.3 |
| 2011/0107541 A1 | 5/2011 | Caillot et al. |

FOREIGN PATENT DOCUMENTS

| DE | 10 2006 013 900 A1 | 9/2007 |
| EP | 1 400 422 A1 | 3/2004 |
| WO | 2011/160952 A1 | 12/2011 |

OTHER PUBLICATIONS

International Search Report for corresponding International Application No. PCT/FR2013/051839, dated Nov. 7, 2013 (2 pages).

* cited by examiner

*Primary Examiner* — Andrew A Horton
(74) *Attorney, Agent, or Firm* — Osha Liang LLP

(57) ABSTRACT

The invention relates to a connection device (7) suitable for connecting a wiper blade for a window of a vehicle to a wiper arm, including at least one means (19) for rigid connection onto the wiper blade and a means (25) for linking to the wiper arm, said connection device (7) including a circuit (11) capable of channeling a liquid, characterized in that the circuit (11) is defined by at least one tube (12) and in that the rigid connection means (19) and the linking means (25) are at least partially molded around the tube (12). The invention can be used for motor vehicles.

15 Claims, 2 Drawing Sheets

DEVICE FOR CONNECTING A WIPER ARM AND A WIPER BLADE TOGETHER INCLUDING AN OVER-MOULDED TUBE

The field of the present invention is that of equipment for vehicles, and more particularly that of equipment for wiping windows of a vehicle. The present invention relates to a connection device which provides a mechanical connection between a wiper arm and a wiper which can wipe a windscreen or a rear window of the vehicle.

Motor vehicles are generally equipped with a windscreen wiper system to provide wiping and washing of the windscreen, and to prevent the driver's view of his environment from being disrupted. These windscreen wipers are conventionally driven by an arm which performs an angular to-and-fro movement, and comprises elongate wipers which themselves comprise scraper blades made of a resilient material. These blades rub against the windscreen and remove the water, taking it outside the field of vision of the driver. The wipers are made either in the form, in a conventional version, of articulated swing bars which hold the scraper blade in several discrete locations, or, in a more recent version known as flat blade, in the form of a semi-rigid assembly which retains the scraper blade along its entire length. In this second solution, the wiper is attached to the rotary arm of the windscreen wiper by an assembly consisting of a mechanical connector and an adapter. The mechanical connector is a part which is crimped directly onto the flat wiper, whereas the adapter is an intermediate part which allows the connector to be secured on the arm of the windscreen wiper.

The above-described mechanical connector is produced by a molding process, comprising at least one slide, the extraction of which makes it possible to generate recesses in which a washing liquid for the windscreen wiper can circulate. This molding process requires removal of the slide at an outer surface of the connector. Also, this removal generates a sleeve which projects from the outer surface of the connector.

A production process of this type has several disadvantages.

Firstly, the sleeve is generated on an outer surface of the connector where it may be necessary to create an orifice for spraying the washing liquid onto the windscreen. The presence of the sleeve then impedes the production of the spraying orifice, in particular when the position of the sleeve interferes with the position of the spraying orifice.

Secondly, the presence of the sleeve projecting from the mechanical connector detracts from the general esthetic appearance of this connector, in particular since it is necessary to conceal this sleeve by means which are added onto the connector.

The objective of the present invention is thus to eliminate the above-described disadvantages, by designing a connection device which does not require use of a slide in order to generate a recess in the connection device. The liquid circuit is created by a previously formed tube, around which functional forms of the connection device are over-molded.

The subject of the invention is thus a connection device which can connect a wiper for a window of a vehicle to a wiper arm, comprising at least one means for securing on the wiper, and a means for connection with the wiper arm, said connection device comprising a circuit which can channel a liquid, characterized in that the circuit is delimited by at least one tube, and in that the securing means and the connection means are molded at least partly around the tube. A connection device of this type is recognizable for example by making a cut in it which passes via the circuit, and determining the existence of a delimitation between the material which constitutes the tube, and the material of the connection device which surrounds this tube at least partly. A connection device of this type is also recognizable in that it does not comprise a particular form on the outer surface of the connection device in the extension of the channel, this form being associated in particular with the extraction of the slide in the production process according to the prior art.

According to one embodiment of the invention, the tube delimits a duct which extends according to a longitudinal direction of extension of the connection device, which is connected hydraulically to a channel which extends according to an axis transverse to the longitudinal direction.

According to one embodiment, the tube can delimit a first and a second duct which both extend parallel to the longitudinal direction of extension of the connection device. A solution of this type makes it possible to supply with liquid a wiper which is provided with at least a first ramp upstream from the wiper and a second ramp downstream from the wiper, according to the movement of rotation of the wiper. In particular, the wiper can thus comprise four ramps distributed in pairs on both sides of the connection device.

According to another embodiment, the tube delimits piping in communication with the channel, said piping extending according to an axis which intersects the axis of extension of the channel. This piping supplies the channel with liquid, and thus forms supply piping for this channel.

The connection device according to the invention can comprise a base in which the duct is provided, said base being surmounted by a flank in which the channel and the connection means are arranged at least partly. The base and the flank are thus molded around the tube which delimits the circuit.

It will be noted that the securing means can be arranged in the base.

Optionally, the piping is formed in the flank. The piping can supply the channel with liquid.

According to one embodiment of the invention, the piping delimited by the tube opens from the flank. A joining piece is thus formed, on which a tube for conveying liquid for the wiper can be placed.

The duct which is delimited by the tube opens from at least one longitudinal end of the base. This duct ensures the distribution of the liquid in two portions of the wiper which are situated on both sides of the connection device. The parts of the duct which open out form joining pieces on which one or more spraying ramps with which the wiper is equipped can be placed.

According to one embodiment, the tube is made partly or entirely of a metal material. Alternatively, the tube is made at least partly of a synthetic material.

The securing means and the connection means, in particular the base and the flank of the connection device, are made of a synthetic material which surrounds all or part of the tube. This involves for example over-molding of plastic material, which in particular is filled with glass fibers.

The connection device according to the invention can comprise an area in which at least one spraying orifice is arranged, which is designed to spray the liquid onto the window. An area of this type forms an outer surface of the base which is without a form obtained by molding in the extension of the channel.

The invention also relates to a system for wiping a window of a vehicle, comprising a wiper which is connected mechanically to a wiper arm at least by a connection device as previously described.

In a situation of this type, the wiper comprises at least one ramp for spraying a liquid for washing the window, which ramp is supplied with washing liquid by the connection device. A ramp of this type can be divided into two portions, each extending longitudinally along the wiper on both sides of the connection device. These portions can be formed by two air deflectors which are added onto the wiper.

A first advantage of the invention consists of the absence of a sleeve which projects from the connection device at an area where it is appropriate to arrange one or more spraying orifices.

An absence of this type makes it possible to position one or more spraying orifices in the connection device without this positioning being impeded by the presence of a projecting sleeve. An effect of this type is particularly advantageous in order to comply with a principle of distribution of the spraying orifices along the entire direction of longitudinal extension of the wiper, including at the connection device. An example of this principle is described in particular in document WO2011/160952A1.

In addition, the aesthetic appearance of the connection device is significantly improved, since the unattractive form of the sleeve can be eliminated.

Other characteristics, details and advantages of the invention will become clearer from reading the following description provided by way of indication in relation with the drawings, in which.

It should be noted that the figures show the invention in a detailed manner in order to implement the invention, and it will be appreciated that said figures can be used to define the invention better if applicable.

Hereinafter in the description, the terms longitudinal or lateral refer to the orientation of the wiper or the connection device according to the invention. The longitudinal direction corresponds to the main axis of the wiper on which it extends, whereas the lateral orientations correspond to intersecting straight lines, i.e. which intersect the longitudinal direction, and in particular are perpendicular to the longitudinal axis of the wiper on its plane of rotation. For the longitudinal directions, the terms outer or inner are determined relative to the point of securing of the wiper on the arm, with the term inner corresponding to the part where the arm and a half wiper extend. Finally, the directions indicated as upper or lower correspond to orientations perpendicular to the plane of rotation of the wiper, with the term lower relating to the plane of the windscreen.

Figure 1:
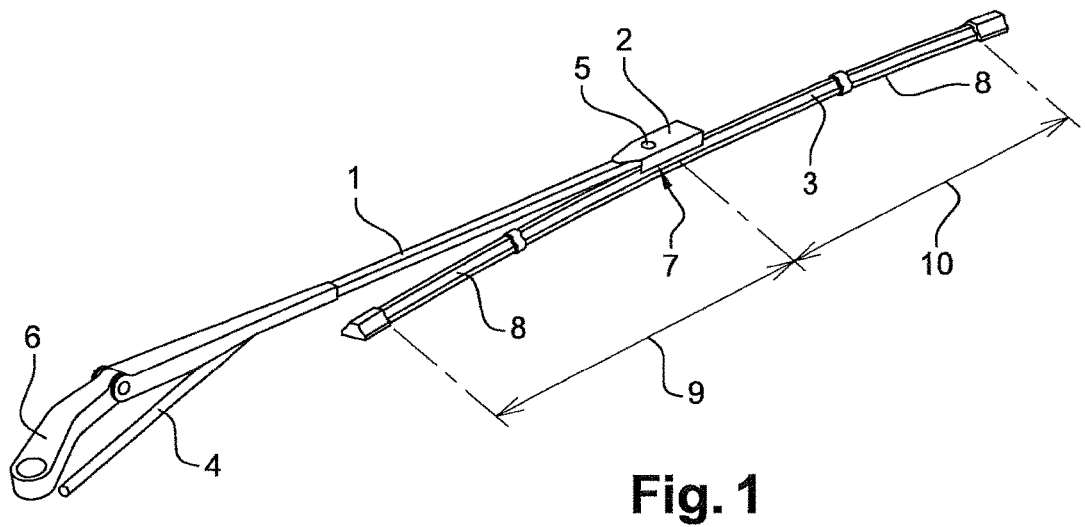
FIG. 1 is a general view in perspective of a wiping system for a window of a motor vehicle, according to the invention.

With reference firstly to FIG. 1, a wiping system is shown consisting of a wiper holder or wiper arm 1 which is extended at its outer end by an end part 2 which is secured on the inner side, for example by being crimped, on the wiper arm 1. The end part 2 co-operates with an adapter which supports a wiper 3 by means of a connection device 7 according to the invention. The purpose of the adapter is for example to be inserted in the end part 2 by means of a movement of translation according to a longitudinal direction, in order to be put into a position of use, where it is positioned so as to abut a co-operating form provided on the end part 2. It is then secured there reversibly, for example by means of a retractable locking button 5, which is secured on the end of a flexible tongue which is part of the adapter, and co-operates with a recess provided for this purpose in the upper part of the end part 2.

The adapter and the connection device 7 are connected to one another mechanically by means of a connection means. According to one embodiment, this connection means is a pivot connection provided between the adapter and the connection device 7 according to the invention. The wiper 3 is thus retained in translation opposite the wiper arm 1, whereas rotation around a pivot connection is permitted by the connection means.

A tube 4 for supply of liquid passes along the wiper arm 1. This tube 4 channels a washing liquid for the windscreen in order to supply it to the connection device 7 between the wiper arm 1 and the wiper 3.

The wiper 3 comprises at least one ramp 8 for spraying the liquid for washing the window. This spraying ramp 8 is provided with washing liquid by the connection device 7. A spraying ramp 8 of this type can be distributed on both sides of the connection device 7 in a first portion with the reference 9 and a second portion with the reference 10. The first portion 9 extends longitudinally along the wiper 3, on the inner side of the latter, whereas the second portion 10 extends longitudinally along the wiper 3, on the outer side of the latter. The first portion 9 and the second portion 10 are both connected hydraulically to the connection device 7.

The spraying ramp 8 can for example be formed by a tube which is provided with sprinkling orifices, and is then added onto the wiper 3. It can also be implemented in the form of an air deflector which caps the wiper 3, and in which there is provided firstly a duct for circulation of the washing liquid, which extends along the longitudinal direction of the wiper 3, and secondly a plurality of orifices for sprinkling the washing liquid.

The wiper 3 can comprise a support inside which there is accommodated a strengthening vertebra. Alternatively, the support can be provided with two open slots disposed laterally, these two slots each receiving a strengthening vertebra. The support also comprises a longitudinal cavity in which there is inserted a scraper, otherwise known as a wiper blade. The latter is a flexible component of the wiper 3 which is supported against the outer surface of the windscreen.

On its upper part, the support can be covered by the air deflector which is designed to use the dynamic effect of the travel of the vehicle in order to increase the support force of the wiper 3 on the windscreen. As previously stated, this air deflector can also form the spraying ramp with which the wiper 3 is provided.

At the end opposite the end part 2 relative to the wiper arm 1, there is a drive unit 6 which is provided with a hole through which a shaft of a drive motor or a rod assembly passes, in order to rotate the wiping system.

Figure 2:
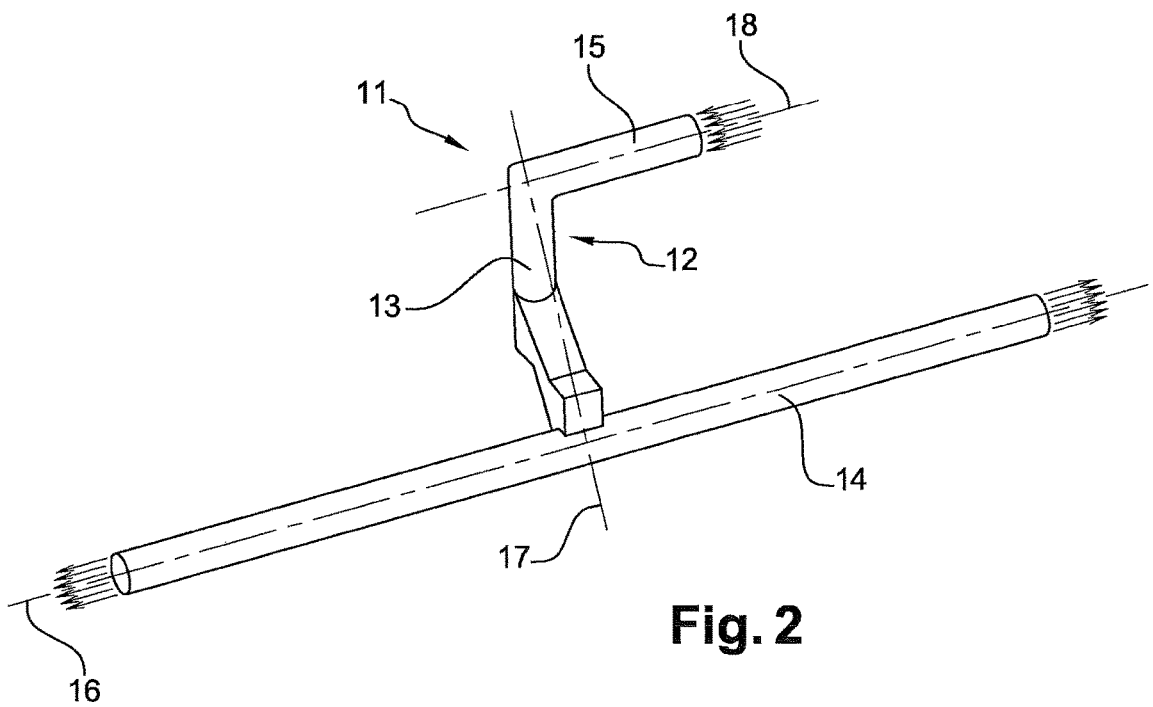
FIG. 2 is a view in perspective of a tube used in the connection device according to the invention.

FIG. 2 shows a semi-finished part which constitutes the connection device according to the invention. It consists of the circuit 11 of the connection device, the function of which is to channel the washing liquid for the windscreen, in order to distribute it in each of the portions of the spraying ramp of the wiper.

This circuit 11 is delimited by at least one tube 12, inside which the washing liquid can circulate. According to the example in FIG. 2, the circuit comprises a first tube, known hereinafter as the channel 13, which is in hydraulic communication with a second tube, known as the duct 14. Optionally, the circuit 11 comprises a third tube known as the piping 15, the latter being used to supply the channel 13 with washing liquid.

The duct 14 forms the part of the circuit which distributes the liquid according to two opposite directions, towards each of the portions of the spraying ramp of the wiper. The channel 13 forms the part of the circuit which supplies the duct 14 with liquid. Finally, the piping 15 forms the part of the circuit which supplies the channel 13 with liquid.

The duct 15 extends according to a longitudinal direction of extension 16 of the connection device. This longitudinal direction 16 is for example straight. The channel 13 extends according to an axis 17 which is transverse, and for example perpendicular to the longitudinal direction 16. In particular, the channel 13 is installed in the center of the duct 14 according to the longitudinal direction 16.

The piping 15 for its part extends along an axis 18 which intersects, and for example is perpendicular to, the axis 17 of the channel 13. The axis 18 of the piping can thus be parallel to the longitudinal direction of extension 16 of the duct 14.

According to one embodiment, the tube 12 can be made of metal, and in particular an aluminum, brass or steel alloy. As an alternative, the tube 12 can be made of synthetic material.

Figure 3:
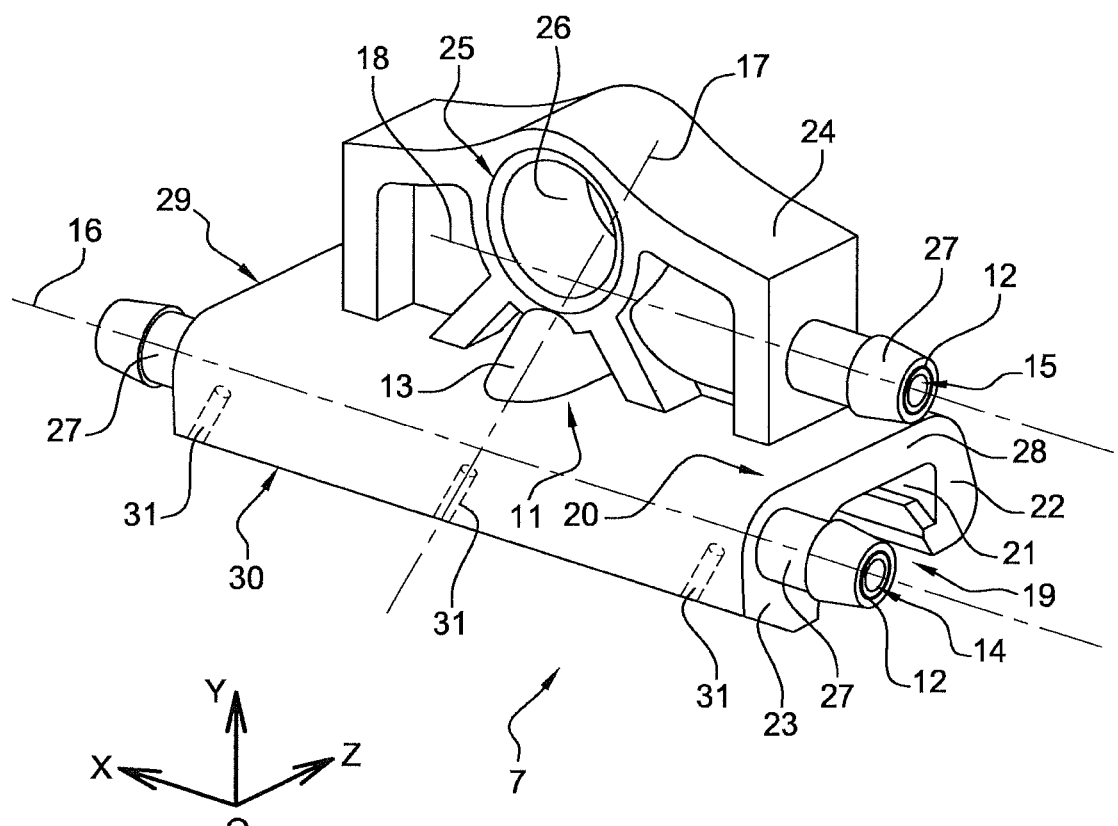
FIG. 3 is a view in perspective of a connection device according to the invention.

With reference now to FIG. 3, the connection device 7 according to the invention can be seen in greater detail. This part is defined with orthonormal references OX-OY-OZ, where the direction OX represents a longitudinal direction, the direction OZ represents a vertical direction, and the direction OY represents a transverse direction.

This connection device 7 is designed to be rendered integral, for example by being crimped, with the wiper which is displaced on the vehicle windscreen. A wiper of this type is rotated by the wiper arm.

The connection device 7 provides a so-called complete mechanical connection with the wiper, in the sense that there is no degree of freedom. This complete mechanical connection is provided by a securing means 19 which is arranged on the connection device 7.

The connection device 7 comprises a base 20 which extends longitudinally and transversely. This base 20 receives the securing means 19 on the wiper, and more particularly on a strengthening vertebra of this wiper. This securing means 19 is for example in the form of at least one undercut 21 provided in the base 20.

According to one embodiment, the base 20 can comprise two undercuts 21 which are opposite one another and are each arranged in arms 22 and 23 which delimit the base 20. These two undercuts 21 thus form hooks which can engage on the wiper.

The base 20 is surmounted by a flank 24, which for example is integral with this base 20. This flank 24 has a transverse dimension and a longitudinal dimension which are smaller than those of the base 20. The flank 24 is for example centered on the base 20, according to the transverse axis OY and the longitudinal axis OX.

The connection device 7 and the wiper arm are connected mechanically, in particular via the adapter, by a connection means 25, for example a pivot connection. As far as the connection device 7 is concerned, this pivot connection is implemented by a cavity 26 provided in the flank 24. This cavity 26 extends according to a direction parallel to the transverse direction OY. In other words, the cavity 26 can be a hole with a central axis parallel to the transverse direction OY. On the plane OXZ, the cavity 26 has a circular cross-section.

The connection device 7 provides a function of conveying and distribution of the washing liquid for the windscreen. For this purpose, the connection device 7 comprises the circuit 11 which is described in detail with reference to FIG. 2.

According to the invention, the securing means 19 and the connection means 25 are molded at least partly around the circuit 11, i.e. around the tube 12 which forms at least the channel 13. Advantageously, the securing means 19 and the connection means 25 are molded all around, and on the entirety of the tube 12 formed by the duct 14, the channel 13 and the piping 15, clearly with the exception of the orifices at the end of the duct 14 and the piping 15. It is understood here that the securing means 19 and the connection means 25 are over-molded on the tube 12.

The base 20 is at least partly over-molded around the tube 12 which forms the duct 14, whereas the flank 24 is at least partly over-molded around the tube 12 which forms the channel 13 and the piping 15.

This over-molding is carried out by an injection of synthetic resin in the interior of a mold which contains the tube 12. The resin in the liquid state is distributed all around the tube 12, and confines it. After solidification, the connection device 7 can be put into use. In this case, the invention avoids the use of extractable slides utilized during the molding process.

The duct 14 is delimited by the tube 12 which extends such as to form a straight recess, in particular with a circular cross-section. This duct 14 extends according to the longitudinal direction 16, the latter being parallel to the longitudinal direction OX. A duct 14 of this type is provided on a side of the base 20, the latter giving rise to two joining pieces 27 which cover two longitudinal ends of the tube 12 which forms the duct 14.

The means for distribution of the washing liquid which constitutes the wiper, for example the aforementioned air deflector, is thus placed on each joining piece 27.

The flank 24 surrounds the tube 12, thus forming the channel 13 which is arranged in the connection device 7, in order to supply the duct 14 with liquid. The channel 13 and the duct 14 are thus in hydraulic communication with one another. The channel 13 is delimited by the tube 12 which extends in a straight manner according to the axis 17 transversely to the duct 14, advantageously intersecting the longitudinal direction 16 of the duct 14.

According to one embodiment, the channel 13 can be disposed perpendicularly to the duct 14. In other words, the axis 17 of the channel 13 is at right angles to the longitudinal direction 16 of the duct 14. The term perpendicular covers all the positions which are substantially perpendicular, of the channel 13 relative to the duct 14, i.e. with incorporation of the production tolerances of the connection device 7.

According to one embodiment of the invention, the tube 12 is formed such that the channel 13 is connected to the duct 14 in a particular location of the latter. The channel 13 is thus centered on the duct 14 according to the longitudinal direction 16, relative to two longitudinal ends 28 and 29 which border the base 20. In other words, a first distance which separates the axis 17 of the channel 13 from a first longitudinal end 28 of the base 20, is equal, or substantially equal because of the production tolerances, to a second distance which separates this same axis 17 from a second longitudinal end 29 which borders the base 20. An equal distance of this type can also be noted in relation to end edges of the joining pieces 27.

The perpendicular and centered arrangement of the channel 13 relative to the duct 14 makes it possible to distribute the liquid which circulates in the duct in an identical manner on both sides of the channel 13.

According to one embodiment, the connection device 7 receives the tube 12 such that the piping 15 is connected hydraulically to the channel 13. The purpose of this piping 15 is to supply with liquid the channel 13, and subsequently the duct 14. This piping 15 is delimited by the tube 12 which extends in a straight manner in the flank 27, the tube 12 opening from the connection device 7 via a joining piece 27, such as to connect the connection device hydraulically to the liquid supply tube indicated as 4 in FIG. 1. This piping 15 extends according to the transverse axis 18, in other words intersecting the axis 17 of the channel 13. This axis 18 of the piping 15 can for example be parallel to the longitudinal direction 16 along which the duct 14 extends.

According to one embodiment of the invention, the connection device 7 can comprise an area 30 provided along the duct 14, making it possible to produce at least one orifice 31 for spraying of the liquid onto the window which is wiped by the wiper. Advantageously, the area 30 makes it possible to distribute a plurality of spraying orifices 31. An area 30 of this type does not have a form which is liable to impede the distribution of the spraying orifices 31, in particular because of the fact that the connection device is not produced from a slide during the molding operation. There is therefore no form which projects from the connection device at the area 30, in the axial extension of the channel 13. This possibility is derived from the invention, i.e. from the fact that the circuit is delimited by a tube around which the remainder of the connection device is molded, i.e. at least the securing means and the connection means.

The spraying orifice(s) 31 is/are for example a hole/holes with a transverse axis, which is advantageously perpendicular to the longitudinal direction 16 of the duct 14. These holes thus connect the duct 14 to the environment which surrounds the connection device 7.

According to one embodiment, this area 30 is provided on an outer surface of the base 20. This area extends according to the longitudinal direction OX, parallel to the duct 14, and over an angular sector determined around the longitudinal direction 16 of the duct 14. This area 30 is for example formed on a lower part of the base 20, i.e. adjacent to the securing means 19.

With the flank 24 surmounting the base 20, it is considered that the area 30 is arranged on a portion of the outer surface of the base 20, opposite the flank 24, relative to the duct 14.

According to one embodiment, it is thus considered that an area 30 is formed when there is a smooth wall of the outer surface of the base 20 which extends longitudinally according to the longitudinal direction OX along the duct 14, over at least 50% of this outer surface, this smooth wall then being provided with the spraying orifices. The smooth nature of the wall is formed since the wall is without forms which could impede the piercing of a spraying orifice in the axial extension of the channel 13.

According to another embodiment, not illustrated, the area is formed by a groove provided in the base along the duct. A groove of this type is recessed towards the duct, relative to the outer surface which delimits the base. In other words, this groove is a straight cavity which is provided along the duct. The length of the holes which form a spraying orifice is therefore reduced to the thickness of the tube which delimits the duct at right angles to the groove.

The material used to form the securing means and the connection means is synthetic. It is for example polybutylene terephthalate (PBT) or a polyamide filled with 30% glass fibers. Thus, the base 20 and the flank 24 can be produced from one of these materials. In the case when the tube 12 is produced from a synthetic resin, it has a melting point higher than the temperature of the resin used to mold the securing means 19 and the connection means 25, at the moment of its injection into the mold in order to form the connection device 7.

It will be noted that the distribution of the spraying orifices arranged in the area 30 need not be constant. In other words, the spacing which separates each pair of spraying orifices is different. It can for example be evolutionary and linear, in particular increasing or decreasing from one longitudinal end to the other of the connection device 7.

In the wiping system according to the invention, it can be noted that the sprinkling orifices of the wiper and the spraying orifices 31 of the connection device 7 can be distributed according to the longitudinal direction of the wiper, such as to comply with non-constant spacing between orifices. In other words, the spraying orifices which are arranged in the connection device 7 are provided in the continuity of the sprinkling orifices provided in the spraying ramp of the wiper. The distribution principle defined in document WO2011/160952A1 is therefore not interrupted by the presence of an obstructive form arranged on the connection device 7.

According to one embodiment, the variability of spacing of this type can be linear, in an increasing or decreasing manner, from one longitudinal end to the other of the wiper which constitutes the wiping system according to the invention.

The above-described embodiments describe a connection device comprising a single duct which extends according to the longitudinal direction. However, the invention covers a so-called dual-duct connection device, in the sense that it comprises two parallel ducts which are delimited by the tube, for the purpose of supplying with liquid a wiper comprising ramps which are upstream and downstream, in relation to the movement of rotation of this wiper.

The invention claimed is:

1. A connection device which can connect a wiper for a window of a vehicle to a wiper arm, comprising:
    at least one means for securing the connection device on the wiper; and
    a means for connection of the connection device with the wiper arm, said connection device comprising a circuit which can channel a liquid,
    wherein the circuit is delimited by at least one tube, and the securing means and the connection means are molded at least partly around the tube,
    wherein the connection means are molded at least partly around the circuit, and
    wherein the means for connection and the means for securing are formed of a first material, and the at least one tube is formed of a second material, the first material being distinct from the second material.

2. The device as claimed in claim 1, wherein the tube delimits a duct which extends according to a longitudinal direction of extension of the connection device, which is connected hydraulically to a channel which extends according to an axis transverse to the longitudinal direction.

3. The device as claimed in claim 2, wherein the tube delimits piping in communication with the channel, said piping extending according to an axis which intersects the axis of extension of the channel.

4. The device as claimed in claim 2, further comprising a base in which the duct is provided, said base being surmounted by a flank in which the channel and the connection means are arranged at least partly.

5. The device as claimed in claim 4, wherein the securing means are arranged in the base.

6. The device as claimed in claim 4, wherein the piping is formed in the flank.

7. The device as claimed in claim 4, wherein the piping formed by the tube opens from the flank via a joining piece.

8. The device as claimed in claim 4, wherein the duct which is formed by the tube opens from at least one longitudinal end of the base via a joining piece.

9. The device as claimed in claim 1, wherein the second material of the tube is at least partly made of a metal material.

10. The device as claimed in claim 9, wherein the first material is at least partly a plastic material or a resin material.

11. The device as claimed in claim 1, wherein the first material of the securing means and the connection means is a synthetic material.

12. The device as claimed in claim 1, wherein at least one spraying orifice is provided, which is designed to spray the liquid onto the window.

13. A system for wiping a window of a vehicle, comprising:

a wiper which is connected mechanically to a wiper arm at least by the connection device as claimed in claim 1.

14. The system as claimed in claim 13, in which the wiper comprises at least one ramp for spraying a liquid for washing the window, which ramp is supplied with washing liquid by the connection device.

15. A connection device which can connect a wiper for a window of a vehicle to a wiper arm, comprising:

at least one means for securing the connection device on the wiper; and a means for connection of the connection device with the wiper arm, said connection device comprising a circuit which can channel a liquid, wherein the circuit is delimited by at least one tube, and the securing means and the connection means are molded at least partly around the tube, wherein the connection means are molded at least partly around the circuit, and wherein the means for connection and means for securing are formed of a synthetic material, and the at least one tube is formed of a metal.

* * * * *